(12) United States Patent
Elfering et al.

(10) Patent No.: US 10,552,190 B2
(45) Date of Patent: Feb. 4, 2020

(54) PRECISE ERROR INJECTION FOR DRIVER TESTING

(71) Applicant: INTERNATIONAL BUSINESS MACHINES CORPORATION, Armonk, NY (US)

(72) Inventors: Herwig Elfering, Boeblingen (DE); Thomas Glaesser, Boeblingen (DE); Karlo Petri, Boeblingen (DE); Bernd Simmet, Boeblingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 472 days.

(21) Appl. No.: 15/406,855

(22) Filed: Jan. 16, 2017

(65) Prior Publication Data

US 2018/0203713 A1    Jul. 19, 2018

(51) Int. Cl.
*G06F 9/455* (2018.01)
(52) U.S. Cl.
CPC ................ *G06F 9/45558* (2013.01)
(58) Field of Classification Search
CPC .... G06F 9/455; G06F 9/4411; G06F 9/45558; G06F 2009/45579
USPC ...................................... 703/23, 24
See application file for complete search history.

(56) References Cited

U.S. PATENT DOCUMENTS

| 8,788,882 B2 | 7/2014 | Schroeder et al. |
| 8,954,312 B2* | 2/2015 | Lloret Portillo .... G06F 17/5027 703/28 |
| 9,141,501 B2 | 9/2015 | Engebretsen et al. |
| 2012/0297380 A1* | 11/2012 | Colbert ............... G06F 9/45558 718/1 |
| 2014/0100841 A1 | 4/2014 | Bures et al. |
| 2016/0125105 A1 | 5/2016 | Lu et al. |

(Continued)

FOREIGN PATENT DOCUMENTS

EP    1235152 A2    8/2002

OTHER PUBLICATIONS

Wind River Systems Inc., "System Architecture Exploration Using Wind River Simics", Aug. 2010, (15 Pages).

*Primary Examiner* — Eunhee Kim
(74) *Attorney, Agent, or Firm* — Margaret A. McNamara, Esq.; Kevin P. Radigan, Esq.; Heslin Rothenberg Farley & Mesiti P.C.

(57) ABSTRACT

A method is provided for verifying functional correctness of a device driver for a controller hardware component being emulated in an emulation environment including a virtual processor. The method includes providing a communication device in the emulation environment. The communication device receives at least one execution condition and an error injection command from a communication device driver associated with the communication device. The controller hardware component executes device operation commands received from the device driver. Based on the communication device determining that the at least one execution condition is fulfilled while the device operation commands are executed, the method provides for the communication device to: halt the operation of the virtual processor; inject an error into the controller hardware component by executing the error injection command; and resume the operation of the virtual processor.

20 Claims, 4 Drawing Sheets

(56) References Cited

U.S. PATENT DOCUMENTS

2018/0060104 A1\* 3/2018 Tarasuk-Levin .... G06F 9/45558
2018/0173548 A1\* 6/2018 Schoenberg ........ G06F 9/45558

\* cited by examiner

PRECISE ERROR INJECTION FOR DRIVER TESTING

BACKGROUND

The present disclosure relates to the field of digital computer systems and, more specifically, to a method for verifying the functional correctness of a device driver.

The development of new computer hardware regularly requires a development of suitable device drivers. A reliable driver must be able to handle all possible exceptions that might occur when operating on real hardware. This is especially true for the Internet of Things (IoT), which is one of the most active fields where new controller drivers are currently being developed; but hardware development for computing centers, data warehouses, web services or other computer systems with a high network integration, where data loss or hardware failure have a strong and immediate economic impact, is affected likewise.

For this reason, developing a new computer device driver must also include thorough testing to obtain provisions for cases when the computer device handled by this driver is not functioning properly. This requires preparing the device into a malfunctioning or error state. While contemporary driver development has grown in efficiency by testing a new driver mainly on emulated hardware, having the driver under test react on a multitude of injected errors is still a time-consuming task. On one hand, a dedicated preparation of the device under test is necessary to have the error take effect as closely to a predetermined point in the command queue as possible, and on the other hand, the emulated computer hardware needs to get restarted for each injected error at a sufficiently early point before the injection point.

SUMMARY

In one or more aspects, the present invention relates to a computer-implemented method for verifying the functional correctness of a device driver for a controller hardware component. The controller hardware component is emulated in an emulation environment, which includes a virtual processor. According to the method, a communication device is provided in the emulation environment. The communication device receives at least one execution condition and an error injection command from a communication device driver associated with the communication device. Device operation commands are received by the controller hardware component from the device driver and executed on the controller hardware component. Based on the communication device determining that the at least one execution condition is fulfilled while the device operation commands are executed, the communication device: halts the operation of the virtual processor; injects an error into the controller hardware component by executing the error injection command; and resumes the operation of the virtual processor.

Computer program products and computer systems relating to one or more aspects are also described in claimed herein. Further, services relating to one or more aspects may also be described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more embodiments of the present invention are explained in greater detail, by way of example only, with reference to the drawings, in which.

DETAILED DESCRIPTION

The descriptions of the various embodiments of the present invention are presented for purposes of illustration, and are not intended to be exhaustive or limiting to the embodiments disclosed. Many modifications and variations will be apparent to those of ordinary skill in the art without departing from the scope and spirit of the described embodiments. The terminology used herein has been chosen to best explain the principles of the embodiments, the practical application or technical improvements over technologies found in the marketplace, or to enable others of ordinary skill in the art to understand the embodiments disclosed.

One or more aspects of the invention relate to the technical field of hardware emulation and may be applied to any current implementation of an emulation environment, such as Simics, OVPSim, QEMU, etc.

In the testing of drivers on emulated hardware, a challenge persists to inject an error into the emulated device when it is in a particular state. Embodiments of a method according to the present disclosure advantageously allow for placing an error within an emulated controller hardware component at any predefined position of the command queue during runtime.

Embodiments may have a beneficial effect by providing an additional communication device in the emulation environment. Such communication device may provide an interface between the emulation environment and the system hosting the testing routines for the device driver, allowing for receiving instructions to be forwarded to the emulation environment or any of its devices and components.

The communication device may provide its own interfaces to the emulation environment and the controller hardware device, or use existing interfaces provided by the emulation environment. Particularly, it may halt and resume the operation of a virtual processor of the emulation environment, access and manipulate memory registers associated with the emulation environment or any of its devices independent from the operational state of the virtual processor, and monitor the device state of any device present in the emulation environment, including the controller hardware component for which the device driver is being tested.

This way, the communication device may enhance the interfaces provided by the emulation environment, providing access to the controller hardware component which is normally protected by the emulation environment. Any entity running outside of the emulation environment and using only the interfaces provided by the emulation environment would encounter a delayed access to the emulated devices at least until any device operation currently acting on the device would finish. In other words, the communication device acts like an exceptional interrupt device for the emulated hardware and the emulation environment with a control interface to the system outside the emulation environment.

One or more embodiments may have the advantage that the emulation does not need to be restarted for testing the device driver on another error after completion of the test cycle for the first error. Instead, the communication device may halt the operation of the virtual processor once more, remove the error that was originally injected into the controller hardware components, roll back the instruction counter of the virtual processor, inject a new error into the controller hardware component, and resume operation of the virtual processor. This may enable the developer of the device driver to test the device driver on a plurality of errors by programming a control loop rather than stopping the emulation environment, preparing suitable new initial conditions for the controller hardware component and the emulation environment for the next error injection, and restarting the emulation environment from the beginning. This way, the disclosed invention may greatly accelerate the testing cycles for controller hardware component drivers.

According to one or more embodiments, the communication device comprises a first interface for changing the state of the emulation environment, wherein the halting and resuming of the virtual processor are performed using the first interface. This may enable a direct control of the virtual processor or the emulation infrastructure as a whole. The first interface may be beneficial for accessing the controller hardware component when the virtual processor is halted while the access to the controller hardware component is reserved for a different process.

According to one or more embodiments, the communication device includes a second interface for changing a device state of the controller hardware component, wherein the sending of the error injection command is performed using the second interface. This may enable a direct, atomic interaction with the controller hardware component, regardless of any other processes which may be performing device operations on the controller hardware component at the time.

The first or the second interface may be used for the determining that the at least one execution condition is fulfilled. For instance, the communication device may use the first interface to monitor an instruction counter of the emulation environment, comparing its value to a predefined value comprised by the at least one execution condition. Using the second interface may include, for example, counting a number of reads performed by the controller hardware device. If this number equals a predefined read number provided in the at least one execution condition, the communication device proceeds with the method by halting the operation of the virtual processor.

According to one or more embodiments, the communication device includes a buffer memory, wherein the method further includes buffering the error injection commands in the buffer memory. This may have the advantage that commands may be executed at any specific, predetermined point during runtime using an interface of the emulation environment. This may reduce the effort needed to customize the communication device to a particular implementation of the emulation environment. According to certain embodiments, the emulation environment includes an application programming interface, wherein the application programming interface includes the first and the second interface.

According to embodiments, the error injected into the controller hardware component is one of an undefined device state, an infinite loop, and a short circuit. Such embodiments may be beneficial to prepare the controller hardware component into a device state which is not provided by the controller or which cannot be reached through the component's deterministic behavior.

According to one or more embodiments, the method further includes providing, by the controller hardware device, a return code after resuming operation of the virtual processor, wherein the return code includes information about the device state. The return code may be provided by writing it to a suitable register of the controller hardware device, the virtual processor, or any other structure present within the emulation environment comprising a register for storing device return codes. Alternatively, the controller hardware device may send the return code to the device driver.

According to embodiments, the method further includes generating, by the controller hardware device, an error code after resuming operation of the virtual processor, wherein the error code is comprised within the return code. This may be beneficial for monitoring the device state after having been manipulated by the communication device, and may accelerate the driver development process by providing more detailed information about the device state in response to the error injection.

According to one or more embodiments, the method includes running the device driver and the communication device driver on a first computer, and running the emulation environment on a second computer. These embodiments may exert a beneficial effect by increasing performance and stability of the testing system hosting the instructions for testing the device driver.

According to one or more embodiments, the execution of the error injection command includes increasing an instruction counter of the virtual processor. This may have the advantage of accelerating the testing routine by enabling the developer to skip device or system operations that do not affect the test results. The emulation environment may thus be forwarded to a point in the execution timeline where the injected error is known to have an effect on the device driver for the first time.

According to one or more embodiments, the method further includes removing the injected error from the controller hardware component. According to one or more embodiments, the removal of the injected error includes restoring the device state of the controller hardware component before the error injection. According to embodiments, the removal of the injected error includes decreasing an instruction counter of the virtual processor. These embodiments may be beneficial by enabling the driver developer to reuse a once set up emulation environment for testing the effect of another error injection on the device driver under test. A removal may be performed by the communication device, for example by deleting data from the memory section representing the controller hardware component that had been written to the component during the error injection; by writing information to the controller hardware component that had been deleted during the error injection; by decreasing the value of the instruction counter to a point of the instruction queue that lies before the point where the error was injected; by breaking infinite loops by setting a pointer to a different area of memory, etc. Removing the injected error from the controller hardware component may be done when the virtual processor is running or halted, as necessary.

In another aspect, the invention relates to a computer program product. The computer program product includes a computer-readable storage medium having computer-readable program instructions embodied therewith. The computer-readable program instructions are configured to implement the method according to embodiments disclosed herein.

In one further aspect, the invention relates to a computer system for verifying the functional correctness of a device driver for a controller hardware component. The computer system includes a processor and memory includes instructions. Executing the instructions causes the system to emulate the controller hardware component in an emulation environment, which includes a virtual processor, and to provide a communication device in the emulation environment. The communication device receives at least one execution condition and an error injection command from a communication device driver associated with the communication device. Device operation commands are received by the controller hardware component from the device driver and executed on the controller hardware component. Based on the communication device determining that the at least one execution condition is fulfilled while the device operation commands are executed, executing the instructions causes the communication device to: halt the operation of the virtual processor; inject an error into the controller hardware component by executing the error injection command; and resume the operation of the virtual processor.

Figure 1:
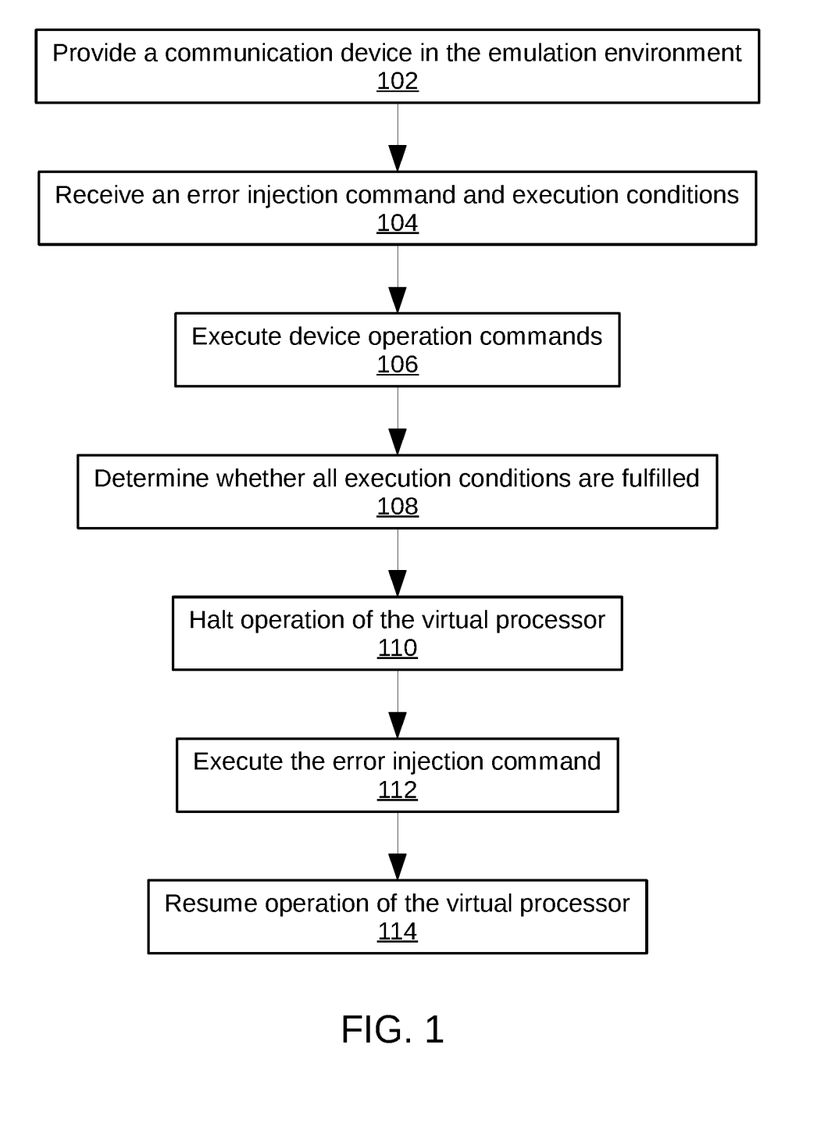
FIG. 1 depicts a schematic flow diagram of an exemplary method for injecting an error into a controller hardware component, according to one or more embodiments of the present disclosure.
Figure 2:
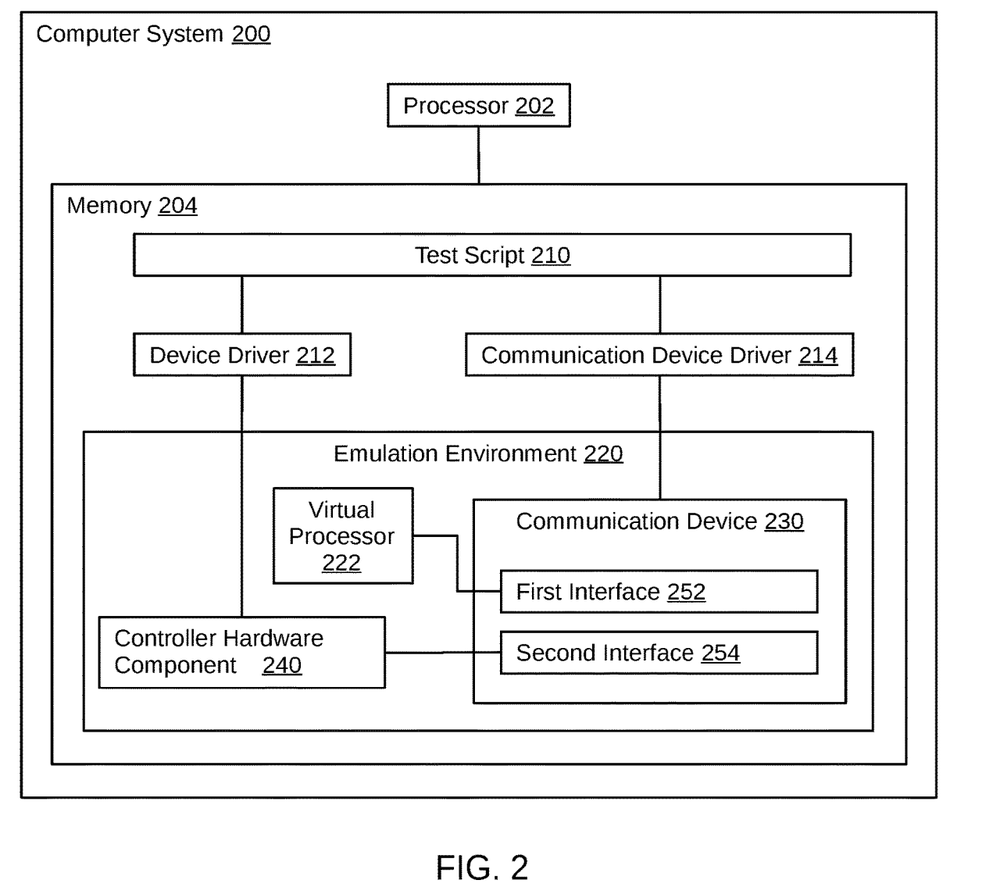
FIG. 2 depicts an exemplary implementation of the communication device in the context an exemplary computerized system, suitable for implementing a method according to one or more embodiments of the present disclosure.

Referring collectively to FIGS. 1 & 2, a schematic flow diagram visualizing an exemplary method for injecting an error into the controller hardware component 240 according to embodiments of the present disclosure is shown in FIG. 1. The method may be applied to computer systems such as the exemplary computer system 200 shown in FIG. 2, where a new device driver 212 for a tangible controller hardware component may be tested with an emulated representation 240 of such component. Typically, the emulated controller hardware component 240 is part of an emulation environment 220 simulating an exemplary computer system where the tangible component is intended to be deployed with the device driver 212. The emulation environment 220 may be any suitable infrastructure where hardware devices can be emulated on a computer system 200. Typically, a simulation model running in a simulation infrastructure may be used, which may be a full system simulator like Simics, OVPsim, or QEMU.

During runtime, access to the hardware emulated inside the emulation environment 220 is restricted whenever these are accessed by a process running within the emulation environment 220. Like in a real-hardware system, the earliest possibility to access one of the emulated devices is when the device is not busy with a device operation like reading or writing. This hampers a thorough testing of a device driver 212 associated with the controller hardware component 240, as an error cannot be injected at any point of the instruction queue. As a result, the driver developer must spend considerable effort on preparing the initial conditions of the controller hardware component 240 or the emulation environment 220 in order to inject an error as closely to the desired point in runtime as possible. The complexity of preparing is increased further by the fact that varying the injected errors or their timings requires different preparation methods.

However, from the point of view of the computer system 200 hosting the emulation environment 220, an emulated device is a data structure within its memory and may therefore be manipulated on host system level if the host-level process accessing the memory allocated to the emulated hardware, namely the emulation environment 220, is halted. This may be done by running an additional process on the host system, which can be represented by a dedicated communication device 230 within the emulation environment 220. While such communication device 230 may act on emulation level to determine 108 whether the conditions for executing an error injection command are fulfilled, it may control the emulation environment and the controller hardware device on host system level to execute 112 error injection commands whenever the emulation precisely meets the conditions required for testing the driver.

According to the disclosed method, the communication device 230 may be provided 102 in the emulation environment 220. It may be created by the developer in a manner which is customized to the specific methods, interfaces and devices provided by the particular emulation environment 220. It may include a reserved range of memory, pointers, interfaces, and device operation routines which are needed to provide the communication device functions as needed.

The interfaces to be provided by the communication device 230 should be a communication interface for receiving and sending data and instructions to and from a communication device driver 214; and an interface to control the state of the emulation environment 220, including any virtual processors. The controller hardware component 240, which is operated by the device driver 212 being tested, may be controlled using a separate interface, which may be a general purpose input/output (GPIO) or a similar generic emulated interface.

Figure 3:
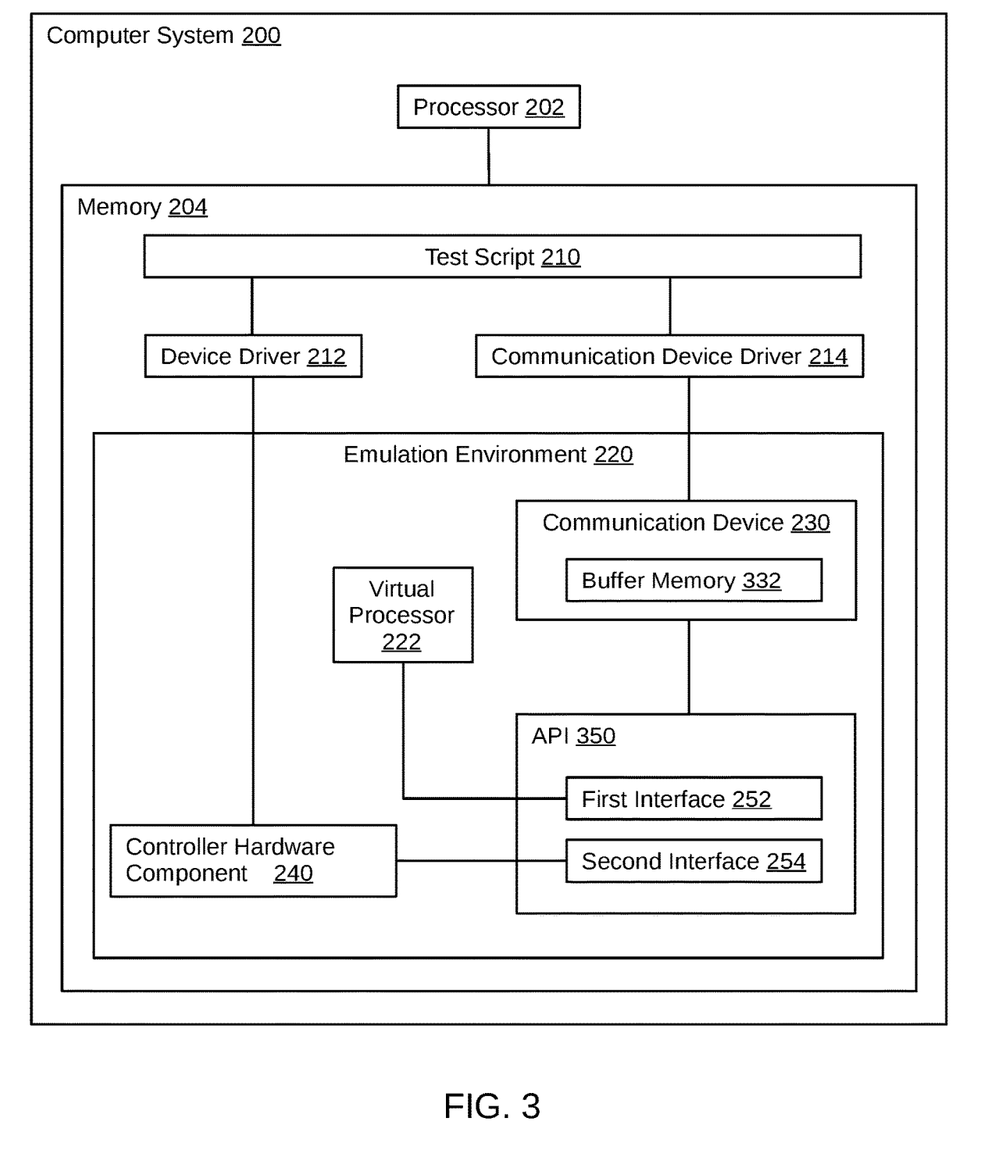
FIG. 3 depicts another exemplary implementation of the communication device in the context of an exemplary computerized system, suitable for implementing a method according to one or more embodiments of the present disclosure.

The communication device 230 may also include a buffer memory 332 to store the data and instructions to be exchanged with the communication device driver 214 for later execution or forwarding to the controller hardware component 240, the emulation environment 220, or any other feature which is present in the emulation environment 220.

The routines present in the communication device 230 should include protocols to communicate with the communication device driver 214 and the controller hardware component 240, and transmission routines to exchange data and instructions between the communication device driver 214, the emulation environment 220, and the controller hardware component 240. The interface between the communication device 230 and its driver may be implemented as memory mapped input/output (MMIO) or the like.

The communication device 230 receives 104 at least one execution condition and an error injection command from the communication device driver 214. The error injection command may be executed on the controller hardware component 240 in the case that the at least one execution condition is fulfilled. For instance, the communication device 230 may monitor an instruction counter of the virtual processor 222 until it reaches a predefined value which is specified in the at least one execution condition. Alternatively, the at least one execution condition may include a predefined number of device operations, such as read or write accesses, which shall be executed before the communication device 230 injects the error. It is understood that the execution condition may relate to any other suitable value, machine or device state, instance of system time, etc. as required for testing the device driver 212 and accessible through the interfaces of the communication device 230.

The error injection command may include reading or writing operations in the area of memory allocated for the controller hardware component 240, changes to pointers within the emulated data structure of the controller hardware component 240, changes to system parameters or system states of the emulation environment 220, shifting of instruction counters including the counter associated to the virtual processor 222, or any other command as required for testing the device driver 212 and accessible through the interfaces of the communication device 230. The at least one execution condition and the error injection commands may be stored in a dedicated buffer memory 332 of the communication device 230.

It is understood that the error injection command may include a plurality or set of instructions, and that it may call other routines, functions, procedures, libraries, or any other kind of program which may be provided by or present in the emulation environment 220 and containing a plurality of instructions.

Furthermore, the controller hardware component may be one out of a plurality of controller hardware components present in the emulation environment. In this case, it is understood that the at least one execution condition or the error injection command may include a specifier for the particular controller hardware component associated with the device driver under test.

In order to realize a realistic test procedure for the device driver 212, the spontaneous occurrence of a hardware failure in a real hardware implementation of the controller hardware component 240 is simulated by testing the driver on error injections in as many device states and situations as possible. A given error injection typically takes place at an arbitrary, but specified position within the command queue of a typical device operation scheme which is implemented by causing the controller hardware component 240 to execute 106 device operations, using device operation commands received from the device driver 212. The at least one execution condition is formulated such that it will become fulfilled at some point while the controller hardware component 240 is executing 106 the device operation commands.

In the case that the communication device 230 determines 108 that the at least one execution condition is fulfilled, it will halt 110 the operation of the virtual processor 222, resulting in a freezing of the emulation environment 220 except for the communication device 230 itself, which continues to be executed by the real-hardware processor 202 of the system hosting the emulation environment 220. The emulation environment 220 may be halted 110 by calling a special command which is usually provided in a programming interface of the emulation infrastructure for this purpose. The halting 110 results in an immediate interrupt of the virtual processor 222, while the machine state of the emulation environment 220 is conserved within the memory of the host system.

The communication device 230 executes 112 the error injection command on the frozen virtual image of the controller hardware component 240 in the host memory, having full access on the whole emulation environment 220 including the controller hardware component 240 without interfering with any ongoing device operations or access restrictions which may be imposed on the controller hardware component 240 by the emulation environment 220 at the time of injection.

After completion of the error injection command, the communication device 230 resumes 114 the operation of the virtual processor 222, the controller hardware component 240 is now working in the device state including the injected error. The resuming 114 of the virtual processor 222 may be performed analogously to the halting 110.

Referring to FIG. 2, a schematic block diagram of a computer system 200 adapted for performing the method according to embodiments disclosed herein is shown. The computer system 200 includes memory 204 and a processor 202 adapted for executing the instructions of a test script 210, the device driver 212, and the communication device driver 214 present in the memory 204. The memory 204 also includes the emulation environment 220 including the virtual processor 222, the communication device 230, and the controller hardware component 240. The communication device 230 includes a first interface 252 for controlling the virtual processor 222 and a second interface 254 for communicating with the controller hardware component 240. The control flow of the testing routine for the device driver 212, which finally utilizes the controller hardware component 240 and the communication device 230, emanates from the test script 210 and reaches the communication device 230 through the communication device driver 214 as well as the controller hardware component 240 through the device driver 212.

The test script 210 contains all necessary instructions to test the device driver 212 on error injections into the controller hardware component 240. These instructions at least include an error injection command, an execution condition for the error injection commands, and the device operation commands to be executed by the controller hardware component 240 when the error is injected. The test script 210 may include, for instance, control loops which, upon execution, enable subsequent injections of the same error at a multitude of execution points, subsequent injections of a multitude of errors at the same execution point, or combinations thereof as required. The test script 210 may further include routines for handling return codes or error codes received from the controller hardware component 240, or routines for removing the injected error from the controller hardware component 240.

FIG. 3 shows a schematic diagram of another implementation of the computer system 200 adapted for performing the method according to embodiments disclosed herein. The computer system 200 includes a processor 202 and memory 204, wherein the processor 202 is adapted for executing instructions of a test script 210 included by the memory 204, as well as running the device driver 212, the communication device driver 214 and the emulation environment 220 also included within the memory 204. The emulation environment 220 includes the virtual processor 222, the communication device 230, the controller hardware component 240, and an application programming interface (API) 350. Again, the test script 210 deploys the device driver 212 to handle the controller hardware component 240 and the communication device driver 214 to handle the communication device 230.

The communication device 230, other than the one shown in FIG. 2, includes a buffer memory 332 adapted for storing the at least one execution condition, the error injection command, and any other instructions and data to be received from the communication device driver 214. In the system according to FIG. 3, the first interface 252 and the second interface 254 are included within the API 350 instead of the communication device 230. In case the communication device 230 determines 108 that the at least one execution condition is fulfilled, the communication device 230 may use the first interface 252 to halt 110 and resume 114 the virtual processor 222 of the emulation environment 220, and the second interface 254 to execute 112 the error injection commands on the controller hardware component 240.

Figure 4:
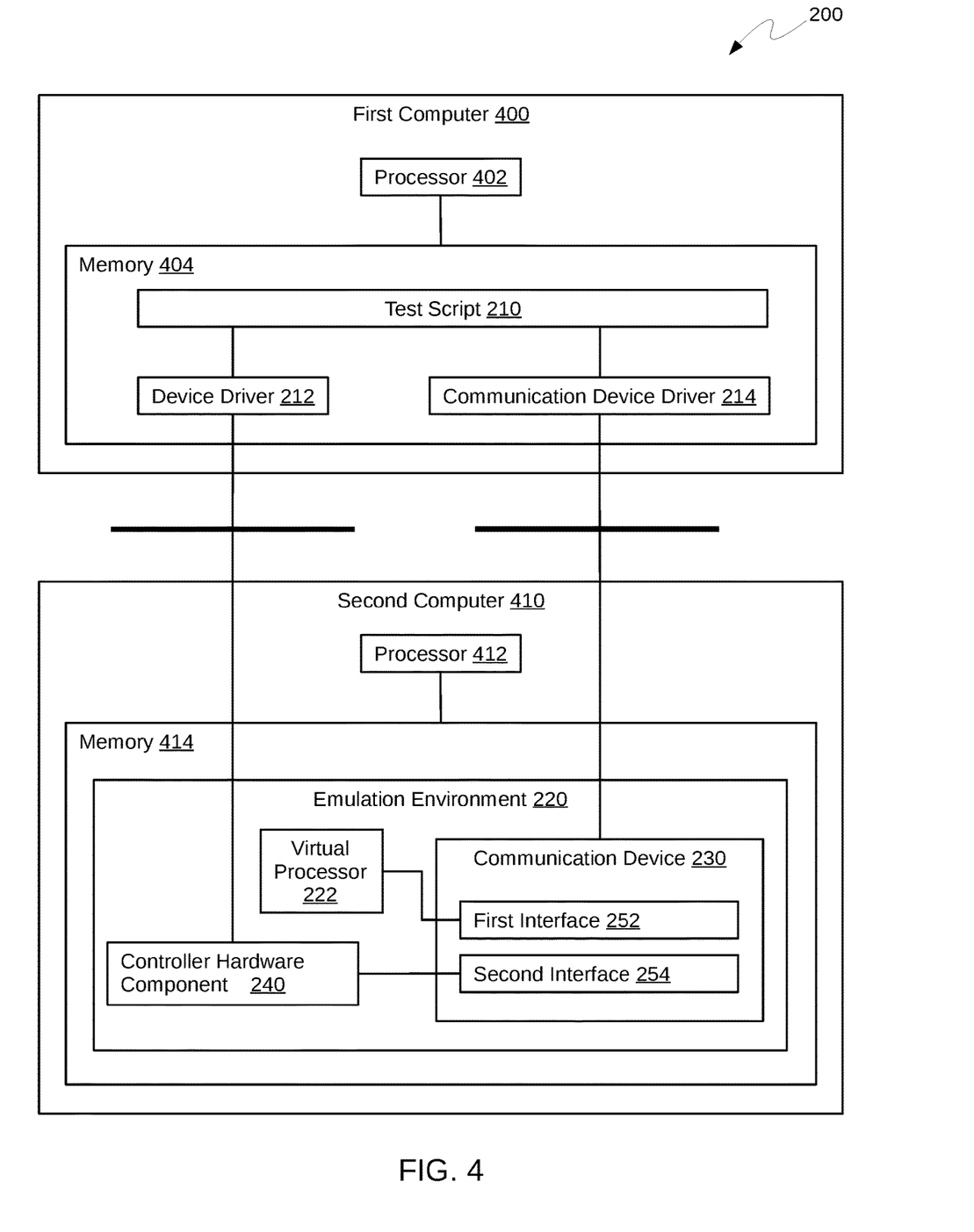
FIG. 4 depicts an exemplary computerized system, suitable for implementing a method, according to one or more embodiments of the present disclosure using two different computers.

Referring to FIG. 4, an further implementation of a computer system 200 adapted for performing a method according to one or more embodiments of the invention disclosed herein is depicted. The computer system 200 includes a first computer 400 adapted for executing the test script 210, the device driver 212, and the communication device driver 214 by its processor 402 in its memory 404. The computer system 200 further includes a second computer 410 being communicatively coupled to the first computer 400. The second computer 410 includes a processor 412 and memory 414 and is adapted to run the emulation environment 220 in its memory 414 using its processor 412. Again, the emulation environment 220 includes the virtual processor 222, the communication device 230 including the first interface 252 and the second interface 254, and the controller hardware component 240. The communication device 230 may control the virtual processor 222 using its first interface 252, and interact with the controller hardware component 240 using its second interface 254.

The communicative coupling between the first computer 400 and the second computer 410 includes a means enabling communication between the communication device driver 214 and the communication device 230, e.g. a communication network, which may be based on Ethernet or the internet protocol. The communicative coupling includes another means enabling the communication between the controller hardware component 240 and the device driver 212, which may likewise be implemented as a communication network, but may also be a dedicated device connection which deploys, for instance, a bus system like universal serial bus (USB), RS-232, or any other suitable wired or wireless connection.

The computer system 200 shown in FIG. 4 may use an identical control flow of the test script 210 over the controller hardware component 240 and the communication device 230, the only difference being that the emulation environment 220 is run by a dedicated processor 412 on the second computer 410, and that the communication of the two drivers with their respective device in the emulation environment 220 may beimplemented as communicative connections between two different computers.

Aspects of the present invention are described herein with reference to flowchart illustrations and/or block diagrams of methods, apparatuses (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the 'C' programming language or similar programming languages. The computer readable program instructions may execute entirely on the user computer system's computer, partly on the user computer system's computer, as a stand-alone software package, partly on the user computer system's computer and partly on a remote computer or entirely on the remote computer or server. In the latter scenario, the remote computer may be connected to the user computer system's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for verifying device driver functional correctness for a controller hardware component, the controller hardware component being emulated in an emulation environment, the emulation environment comprising a virtual processor, the method comprising:
   providing a communication device in the emulation environment;
   receiving at least one execution condition and an error injection command by the communication device in the emulation environment from a communication device driver, of a selected computer system, coupled to the communication device of the emulation environment;
   executing device operation commands on the controller hardware component, the device operation commands being received by the controller hardware component from a device driver of the selected computer system;
   wherein based on the communication device determining that the at least one execution condition is fulfilled while the device operation commands are executed, the method includes, by the communication device:
      halting operation of the virtual processor;
      executing the error injection command, the executing resulting in an injection of an error into the controller hardware component;
      resuming operation of the virtual processor.

2. The computer-implemented method of claim 1, wherein the communication device comprises a first interface for changing a state of the emulation environment, the halting and resuming of the virtual processor being performed using the first interface, the first interface being a first interface in the emulation environment.

3. The computer-implemented method of claim 2, wherein the communication device comprises a second interface for changing a device state of the controller hardware component, the sending of the error injection command being performed using the second interface, the second interface being a second interface in the emulation environment.

4. The computer-implemented method of claim 1, wherein the communication device comprises a buffer memory, and the method further comprises buffering the error injection command in the buffer memory.

5. The computer-implemented method of claim 4, wherein the emulation environment comprises an application programming interface, said application programming interface comprises the first and second interface.

6. The computer-implemented method of claim 1, wherein the error injected into the controller hardware component is one of an undefined device state, an infinite loop, and a short circuit.

7. The computer-implemented method of claim 1, further comprising providing, by the controller hardware device, a return code after resuming operation of the virtual processor, the return code comprising information about a device state of the controller hardware component.

8. The computer-implemented method of claim 7, further comprising generating, by the controller hardware device, an error code after resuming operation of the virtual processor, the error code being included within the return code.

9. The computer-implemented method of claim 1, further comprising running the device driver and the communication device driver on a first computer, and running the emulation environment on a second computer.

10. The computer-implemented method of claim 1, wherein the execution of the error injection command comprises increasing an instruction counter of the virtual processor.

11. The computer-implemented method of claim 1, further comprising removing the injected error from the controller hardware component.

12. The computer-implemented method of claim 11, wherein the removal of the injected error comprises restoring a device state of the controller hardware component before the error injection.

13. The computer-implemented method of claim 11, wherein the removal of the injected error comprises decreasing an instruction counter of the virtual processor.

14. A computer program product for verifying device driver functional correctness for a controller hardware component, the controller hardware component being emulated in an emulation environment, the emulation environment comprising a virtual processor, the computer program product comprising:
   a non-transitory computer-readable storage medium having program instructions embodied therewith, the program instructions being executable by a processor to perform a method comprising:

providing a communication device in the emulation environment;

receiving at least one execution condition and an error injection command by the communication device in the emulation environment from a communication device driver, of a selected computer system, coupled to the communication device of the emulation environment;

executing device operation commands on the controller hardware component, the device operation commands being received by the controller hardware component from a device driver of the selected computer system;

wherein based on the communication device determining that the at least one execution condition is fulfilled while the device operation commands are executed, the method includes, by the communication device:

halting operation of the virtual processor;

executing the error injection command, the executing resulting in an injection of an error into the controller hardware component;

resuming operation of the virtual processor.

15. The computer-program product of claim 14, wherein the communication device comprises a first interface for changing a state of the emulation environment, the halting and resuming of the virtual processor being performed using the first interface, the first interface being a first interface in the emulation environment.

16. The computer-program product of claim 15, wherein the communication device comprises a second interface for changing a device state of the controller hardware component, the sending of the error injection command being performed using the second interface, the second interface being a second interface in the emulation environment.

17. The computer-program product of claim 14, wherein the communication device comprises a buffer memory, and the method further comprises buffering the error injection command in the buffer memory.

18. A computer system for verifying device driver functional correctness for a controller hardware component, the computer system comprising:

a memory; and a processor, the memory comprising instructions, wherein executing the instructions causes the system to emulate the controller hardware component in an emulation environment, the emulation environment comprising a virtual processor, wherein executing the instructions further causes the system to:

provide a communication device in the emulation environment;

receive at least one execution condition and an error injection command by the communication device in the emulation environment from a communication device driver, of a selected computer system, coupled to the communication device of the emulation environment;

execute device operation commands on the controller hardware component, the device operation commands being received by the controller hardware component from a device driver of the selected computer system;

wherein based on the communication device determining that the at least one execution condition is fulfilled while the device operation commands are executed, executing the instructions causes the communication device to:

halt operation of the virtual processor;

execute the error injection command, the executing resulting in an injection of an error into the controller hardware component;

resume operation of the virtual processor.

19. The computer system of claim 18, wherein the communication device comprises a first interface for changing a state of the emulation environment, the halting and resuming of the virtual processor being performed using the first interface, the first interface being a first interface in the emulation environment.

20. The computer system of claim 19, wherein the communication device comprises a second interface for changing a device state of the controller hardware component, the sending of the error injection command being performed using the second interface, the second interface being a second interface in the emulation environment.

* * * * *